R. L. HIGHT.
FLEXIBLE SHAFT.
APPLICATION FILED MAR. 16, 1912.
1,111,714.
Patented Sept. 22, 1914.
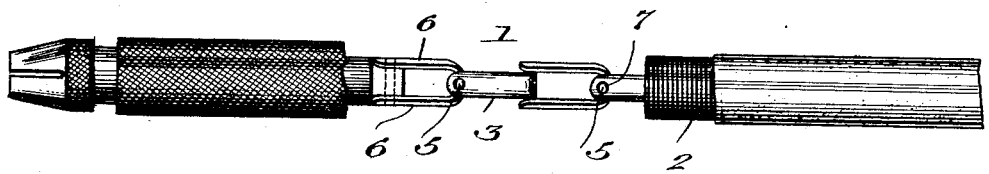
Fig.1.
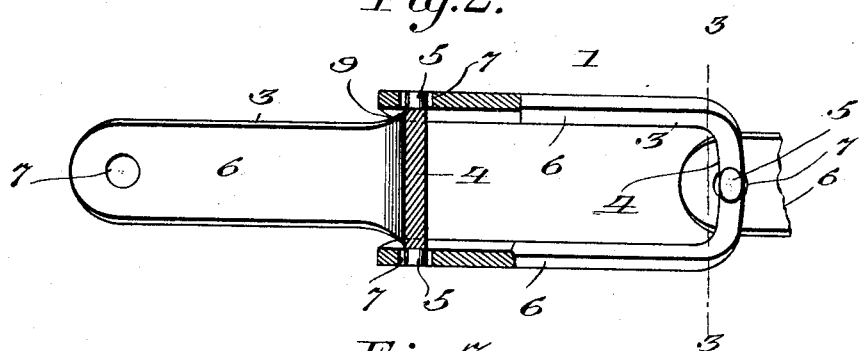
Fig.2.
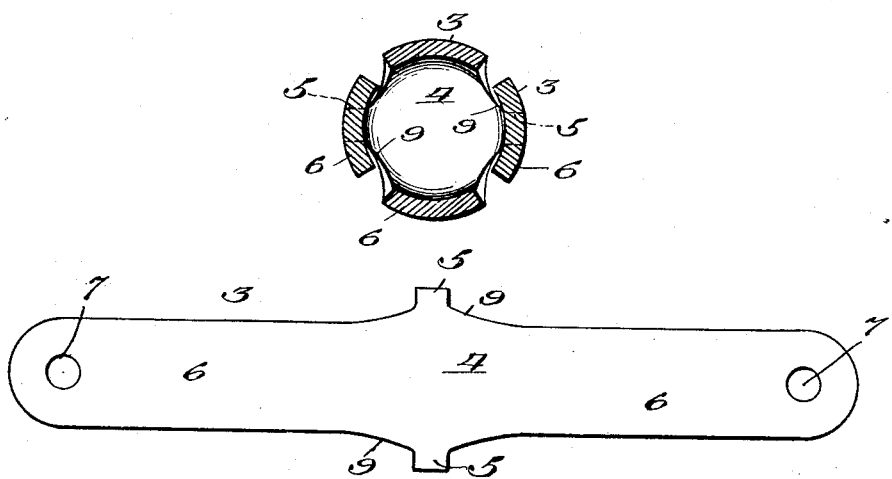
Fig.3.
Fig.4.
WITNESSES
Philip E. Barnes
INVENTOR
R. L. Hight
E. B. Stocking, Attorney
THE NORRIS PETERS CO., PHOTO-LITHO., WASHINGTON, D. C.

UNITED STATES PATENT OFFICE.

ROBERT L. HIGHT, OF DECATUR, ILLINOIS.

FLEXIBLE SHAFT.

1,111,714.  Specification of Letters Patent.  Patented Sept. 22, 1914.

Application filed March 16, 1912. Serial No. 684,359.

*To all whom it may concern:*

Be it known that I, ROBERT L. HIGHT, a citizen of the United States, residing at Decatur, county of Macon, State of Illinois, have invented certain new and useful Improvements in Flexible Shafts, of which the following is a specification, reference being had therein to the accompanying drawing.

This invention relates to certain new and useful improvements in flexible shafts, the object being to provide a shaft formed of a plurality of links pivotally connected together in such a manner that it can be easily and quickly assembled or taken apart and one which is very strong and durable.

Another object of the invention is to provide a flexible shaft formed of links, each link being stamped from a single piece of metal in one operation whereby a flexible shaft is formed which is exceedingly cheap and has all of the advantages obtained by constructions now in use.

Other and further objects and advantages of the invention will be hereinafter set forth and the novel features thereof defined by the appended claims.

In the drawing—Figure 1 is an elevation of my improved shaft showing the same arranged in a flexible casing; Fig. 2 is an enlarged longitudinal section through a series of the links; Fig. 3 is a section taken on line 3—3 of Fig. 2; and Fig. 4 is a plan view of the blank from which the link is formed.

Like numerals of reference refer to like parts in the several figures of the drawing.

In the drawing, 1 indicates a flexible shaft constructed in accordance with my invention, 2 a flexible casing inclosing the shaft in the ordinary manner, said casing being of the ordinary construction. The shaft 1 is formed of a plurality of substantially U-shaped links 3 which are stamped from a sheet of spring tempered metal and comprise a head portion 4 having laterally extending pivot lugs 5 and arm portions 6 at right angles thereto provided with apertures 7 which are adapted to receive the lugs 5 when the links are assembled. In forming the link from the blank as shown in Fig. 4, it is bent as shown by dotted lines to form a head 4, the arms 6 of which are bent on curved lines transversely as clearly shown in Fig. 3. By this construction, a link is formed having pivot lugs over which the apertured ends of the arms are sprung and when the shaft constructed of a plurality of these links is arranged within a flexible casing, it will be impossible for the arms to move outwardly so as to spring off of the lugs whereby an exceedingly strong and flexible shaft is formed. In order to allow each link to swing independently, the edges of the head are beveled as shown at 9 adjacent the lugs 5 to form bearing surfaces upon which the concaved faces of the arm rest.

The main difficulty with flexible shafts now in use is that the pivots work loose and become detached, allowing the links to separate, but by my construction, the use of rivets is dispensed with and a flexible shaft is formed out of a plurality of links, each link having at one end means for attaching it to the adjacent link and at its opposite end means to receive the arms of the adjacent link. By this construction, the cost of manufacturing flexible shafts is greatly reduced and a flexible shaft is formed which has many advantages over flexible shafts of this character now in use as the links can be easily and quickly connected or disconnected and are so connected that when placed within a flexible casing, it will be impossible for the links to become detached.

From the foregoing description, it will be seen that I have provided a flexible shaft which is formed of a plurality of substantially U-shaped links, each link being formed of a single element whereby the additional connecting members now employed for connecting the respective sections together are dispensed with.

What is claimed is—

1. A flexible shaft formed of a plurality of U-shaped links pivotally connected together, each link being formed of a single piece of metal and bent into substantially U-shape, the arms of which are curved transversely and apertured adjacent their ends, the head of each link being provided with beveled edges terminating in laterally projecting lugs at right angles to the arms of the links.

2. As a new article of manufacture, a flexible shaft composed of a plurality of links of the same construction, each link comprising a strip of metal bent into substantially U-shape form, the head of each link being enlarged laterally and terminating in reduced lugs, the arms of said link being curved transversely and apertured adjacent their ends and adapted to receive the lugs of the adjacent link, the enlarged portions of said head fitting in the concavity of the arms and conforming in shape thereto.

In testimony whereof I affix my signature in presence of two witnesses.

ROBERT L. HIGHT.

Witnesses:
L. A. PATCH,
L. ALLEN WRIGHT.

Copies of this patent may be obtained for five cents each, by addressing the "Commissioner of Patents, Washington, D. C."